US008255156B2

(12) United States Patent
Ravenscroft et al.

(10) Patent No.: US 8,255,156 B2
(45) Date of Patent: Aug. 28, 2012

(54) SPATIAL SOURCE COLLECTION AND SERVICES SYSTEM

(75) Inventors: Donald L. Ravenscroft, Broomfield, CO (US); Thorsten Wiesemann, Hofheim am Taunus (DE)

(73) Assignee: The Boeing Company, Chicago, IL (US)

( * ) Notice: Subject to any disclaimer, the term of this patent is extended or adjusted under 35 U.S.C. 154(b) by 562 days.

(21) Appl. No.: 12/123,204

(22) Filed: May 19, 2008

(65) Prior Publication Data

US 2009/0285491 A1 Nov. 19, 2009

(51) Int. Cl.
*G01C 21/00* (2006.01)
*G08G 1/123* (2006.01)

(52) U.S. Cl. ........ 701/409; 701/400; 701/408; 701/436; 701/469; 701/482; 701/484; 701/485; 701/486; 701/519; 340/945; 340/995.1; 340/995.12; 340/995.22; 340/995.24

(58) Field of Classification Search .................. 701/1, 3, 701/8–10, 14–16, 200, 206, 207, 208, 211, 701/213, 214, 300, 301; 340/945, 988, 990, 340/995.1, 995.12, 995.14, 995.16–995.19, 340/995.22, 995.24, 995.25
See application file for complete search history.

(56) References Cited

U.S. PATENT DOCUMENTS 5,574,648 A 11/1996 Pilley
5,848,373 A * 12/1998 DeLorme et al. ............. 701/200
5,898,680 A * 4/1999 Johnstone et al. ............ 370/316
6,246,320 B1 6/2001 Monroe
6,564,147 B2 * 5/2003 Chen et al. .................... 701/213
6,832,156 B2 * 12/2004 Farmer .......................... 701/301
6,920,390 B2 * 7/2005 Mallet et al. .................. 701/120
7,511,662 B2 * 3/2009 Mathews et al. ......... 342/357.48
7,538,688 B1 * 5/2009 Stewart ......................... 340/908
7,663,507 B2 * 2/2010 Nitzan et al. .................. 340/952
7,725,253 B2 * 5/2010 Foxlin ........................... 701/207
7,801,332 B2 * 9/2010 Albertson et al. ............ 382/107
2004/0054511 A1 * 3/2004 Turner et al. ...................... 703/6
2006/0233485 A1 * 10/2006 Allen .............................. 385/13
2007/0021908 A1 * 1/2007 Jaugilas et al. ............... 701/208
2007/0129888 A1 * 6/2007 Rosenberg .................... 701/213
2007/0182713 A1 * 8/2007 Kereth .......................... 345/161

FOREIGN PATENT DOCUMENTS

WO 2006070207 A 6/2006

OTHER PUBLICATIONS

EP Search Report dated Sep. 22, 2009, pp. 1-7.

* cited by examiner

*Primary Examiner* — Hussein Elchanti
*Assistant Examiner* — Rami Khatib
(74) *Attorney, Agent, or Firm* — Yee & Associates, P.C.

(57) ABSTRACT

A method is provided for obtaining data about spatial objects. The data is received from a set of adaptable and programmable sensor units associated with a set of spatial objects in real time to form received data, wherein the data is generated in response to a change in a measurement or time of a sensor unit in the set of sensor units. A collection of data for spatial objects is updated with the received data.

23 Claims, 7 Drawing Sheets

SPATIAL SOURCE COLLECTION AND SERVICES SYSTEM

BACKGROUND INFORMATION

1. Field

The present disclosure relates generally to an improved data process system and in particular to a method and apparatus for processing spatial data. Still more particularly, the present disclosure relates to a computer implemented method, apparatus, and computer usable program code for collecting and providing services that utilize spatial object information.

2. Background

Geographic information system databases contain data representing real world objects, such as roads, land use, and elevation, and virtual objects such navigation waypoints, using digital data. This data may relate information about a real world object to a digital representation of the real world object. This data may also relate to virtual objects which may be defined in a number of different ways. These objects may be, for example, three dimensional and/or four dimensional objects.

An example of a spatial object as a virtual object is a dataset consisting of a geometry, such as a runway polygon, and associated with information, such as three dimensional position, time and effectivity parameters, elevation, surface material, pavement strength or digital imagery of the runway. Information about the spatial object, referred to as “features”, may be stored in a database that may be queried, as well as analyzed. Further, each feature of a spatial object may further contain one or more attributes.

Database systems may be developed using these spatial object models. One type of spatial object database is referred to as an aerodrome mapping database (AMDB). Airlines, air traffic controllers, pilots, and other entities use the information from these databases in many applications for example in moving map displays, for identifying certain properties of different spatial objects, such as an open/closed attribute value or a maximum wingspan for an aircraft on runways and taxiways, and for routing or navigating through air or water. A spatial object is a real world or virtual object that may be of interest with respect to navigating or directing a vehicle. With respect to aircraft, aeronautical objects are specific types of spatial objects of interest in operating an aircraft.

Currently, some spatial objects may be identified by manually collecting information. This process typically involves sending a survey team to a location to obtain information about spatial objects for example objects located at an airport. Further, aerial or satellite observations also may be used in addition to or in place of the survey. This information is used to generate and update information for aeronautical maps and other uses.

With respect to airports, spatial objects may move and/or be added. For example, a crane, the object, may be erected to build various structures on an airport. A barrier, another object, may be moved from one location to another location, and other physical objects may be erected, moved, or altered at an airport. These types of changes require a new survey to add, move, or remove a spatial object from artifacts like an aeronautical map. This type of process is time consuming and expensive. Further, in some cases, the spatial object may be temporary and may be removed prior to a new survey or report on the object being made.

Therefore, it would be advantageous to have a method and apparatus to overcome the problems described above.

SUMMARY

In one advantageous embodiment, a method is provided for obtaining data about spatial objects. The data is received from a set of sensor units associated with a set of spatial objects in real time to form received data, wherein the data is generated in response to a change in a measurement of a sensor unit in the set of sensor units. A collection of data for spatial objects is updated with the received data.

In another advantageous embodiment, an apparatus comprises a set of wireless sensor units associated with a set of spatial objects and server system. The set of wireless sensor units are capable of generation information identifying a set of locations for the set of wireless sensor units and transmitting the location information over a network. The server system capable of receiving the information for the set of wireless sensor units, updating a collection of data for the set of spatial objects, and providing services to a set of clients using the collection of data for the set of spatial objects.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
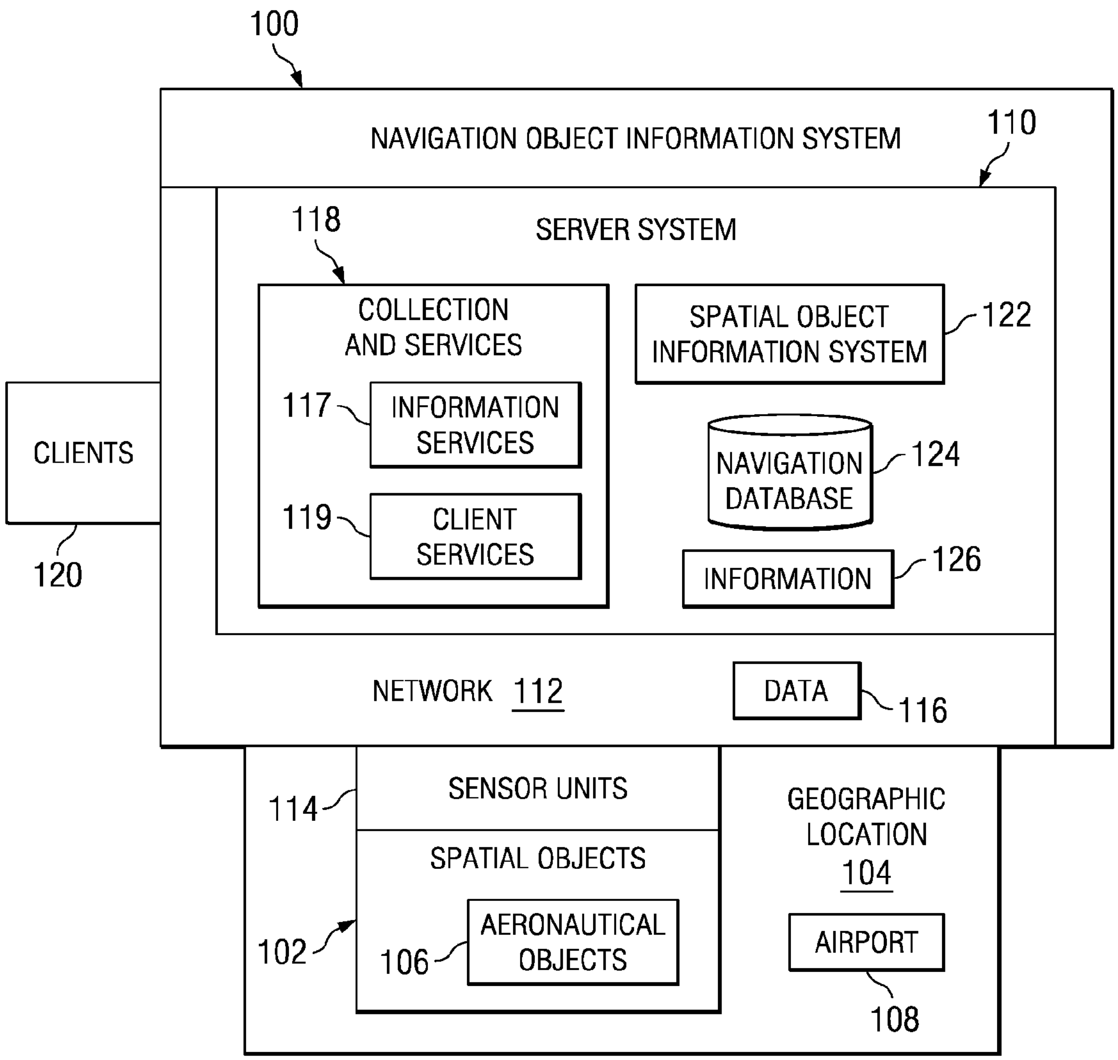
FIG. 1 is a block diagram of a spatial object information system in which an advantageous embodiment may be implemented.

With reference now to the figures and in particular with reference to FIG. 1, a block diagram of a spatial object information system is depicted in accordance with an advantageous embodiment. Spatial object information system 100 includes server system 110, network 112, and sensor units 114. In these examples, sensor units 114 are wireless sensor units and are placed on and/or around spatial objects 102. These sensor units transmit data 116 across network 112 to server system 110.

In this example, spatial object information system 100 provides a capability to obtain information about spatial objects 102 at geographic location 104. In these examples, spatial objects 102 may take the form of aeronautical objects 106 located at airport 108. These aeronautical objects may include, for example, without limitation, buildings, barriers, cranes, runways, taxiways, vehicles, and other suitable physical objects.

Spatial objects 102 also may be virtual objects at geographic location 104. For example, spatial objects 102 may be a dataset consisting of a geometry, such as a runway polygon, and associated with information, such as three dimensional position, time and effectivity parameters, elevation, surface material, pavement strength or digital imagery of the runway. In these examples, effectivity is the time period when the three dimensional position is valid.

In these illustrative examples, sensor units 114 may detect changes in the position of spatial objects 102. In these examples, sensor units 114 are small, light weight, portable, self contained, intelligent, and addressable units that are capable of gathering information about spatial objects 102 to which they are attached. Further, these sensor units may report the location and position back to server system 110.

As an additional feature, sensor units within sensor units 114 may be grouped, associated, and/or programmed to a shape or behavior of a particular spatial object within spatial objects 102, such as a runway. As a result, these sensor units may be made aware of changes in the overall shape of the particular navigation object within spatial objects 102. Sensor units 114 are aware of their locations and they detect changes in their locations.

Further, sensor units 114 also may detect changes in spatial orientation. These changes may be sent back as data 116 to server system 110. Network 112 may be, for example, a wired network, a wireless network, or some combination of the two. In these examples, sensor units 114 may initially transmit data over a wireless medium within network 112. At some point, data 116 may travel over a wired medium in network 112.

Server system 110 is a set of data processing systems. A set, as used herein, refers to one or more items. For example, a set of data processing systems is one or more data processing systems. Data 116 is received by collection and services 118 within server system 110. This component transfers information between sensor units 114 and clients 120.

Collection and services 118 may, in this example, include information services 117 and client services 119. Information services 117 are used to receive data 116 in sensor units 114. Client services 119 may be used to receive requests and send information to clients 120. Clients 120 may be, for example, an aircraft data processing system on an aircraft, a data processing system located in an air traffic control tower, a moving map service, or some other suitable client.

The different services provided by client services 119 may include, for example, aeronautical charts, airport assessments update or reporting, monitoring and alerts regarding navigation objects, security services, emergency landing sites, an identification, home land defense emergency landing sites, home land defense temporary operation sites, aggregation and filtering of spatial object data, notice to airman (NOTAM) real time alerting, data for cogitated applications requiring time variant information, visual flight rules (VFR) object identification, visual flight rules aerial identification abilities, and other suitable services. As an example, information from spatial database 124 may be sent to clients 120 by collection and services 118 in the form of updates to aeronautical maps or moving maps used by clients 120.

Spatial object information system 122 receives data 116 from collection and services 118 and updates spatial information within spatial database 124 using data 116. Navigation database 124 includes information about spatial objects 102. Navigation database 124 also may include other information used to generate navigation maps for use in moving map applications and/or any other suitable service, in these examples.

Further, collection and services 118 also may control sensor units 114 by sending information 126 to sensor units 114 through network 112. Information 126 may include, for example, commands and/or data. Information 126 may provide instructions as to when and how data 116 is collected from monitoring spatial objects 102.

As another example, collection and services 118 also may send information 126 to a portion of sensor units 114 to identify those sensor units as being part of a spatial object in spatial objects 102. This type of information causes those sensor units to identify themselves all with the same spatial object. Further, these sensor units also may communicate with each other in collecting and processing data about the associated spatial object.

In these different advantageous embodiments, sensor units 114 send data 116 in real time to collection and services 118. The use of the term "real time", in these examples, means that data 116 is sent as soon as sensor units 114 detect changes in the position of spatial objects 102.

In other words, real time means that the data is sent as quickly as possible based on the hardware used to send the data. Real time transmission is not necessarily instantaneous but may have some delay caused by the hardware transmitting the data. This type of transmission is not periodic and does not wait to send the data. In other advantageous embodiments, data 116 may be sent periodically rather than in real time. Data 116 also may include other information, such as a time stamp and health information about sensor units 114.

Further, sensor units 114 also may detect other information about spatial objects 102 and/or the environment around spatial objects 102. For example, sensor units 114 may be used to obtain wind speed, wind direction, temperature, humidity, and/or other suitable information.

Additionally, sensor units 114 also may transmit data to clients 120 directly, in some cases. Data 116 also may be sent to clients 120 directly for use in performing operations at airport 108. For example, clients 120 may include a control tower at geographic location 104. Data 116 may include information that may be used to identify wind shear or other conditions that may be used in controlling traffic at and around airport 108.

In still other advantageous embodiments, sensor units 114 may send data 116 directly to a client in clients 120, such as an aircraft. For example, time sensitive information, such as an unexpected runway closures, may be sent to an aircraft. In other embodiments, sensor units 114 may send this information to collection and services 118, which in turn sends the information to clients 120.

As a result, data 116, as detected by sensor units 114, may be used for multiple purposes. In these different examples, data 116 may be used to update navigation database 124 for use in providing updated navigation charts.

The illustration of spatial object information system 100 in FIG. 1 is not intended to imply architectural limitations in the manner in which spatial object information system 100 may be implemented. The different components are illustrated as functional components and not meant to imply physical limitations.

For example, sensor units 114 may be located at other geographic locations other than airport 108. For example, sensor units 114 may be located at additional airports, maintenance facilities, or over terrain at elevations for which information may be desired.

Further, the different advantageous embodiments may be applied to spatial objects other than aeronautical objects 106. For example, the different advantageous embodiments may be applied to maritime or railway navigation. For example, sensor units 114 may be deployed on a spatial object, such as, for example, without limitation, rivers, docks, buoys, and other spatial objects that may be used for maritime navigation.

All of the different advantageous embodiments are described with respect to spatial objects used for aircraft. The different advantageous embodiments may be applied to other types of navigation. For example, some advantageous embodiments may be applied to maritime navigation. With this type of implementation, wireless sensor units may be placed around spatial objects such as, navigable reference points on a river. The wireless sensor units may be used to identify whether a river is in a flood stage by reporting depth changes over time.

Thus, spatial object information system 100 may collect information on a continuous basis from many geographic locations, such as geographic location 104. Further, with this type of information system, other spatial object information databases may be consolidated with this system to providing services for maintaining data. This illustrative spatial object information system in FIG. 1 may provide more accurate data about navigation objects. Additionally, this data may be performed in real time and may provide for continuous distribution to various clients, such as clients 120.

In these examples, in different advantageous embodiments, a method and apparatus is present for obtaining data about spatial objects. The data is received from a set of sensor units associated with a set of spatial objects in real time to form received data, wherein the data is generated in response to a change in measurement of a sensor unit in the set of sensor units.

A collection of data for spatial objects is updated with the received data. As described above in the different illustrative examples, this change in measurement may be, for example, without limitation, a change in position and/or a change in state of the sensor and/or object associated with the sensor.

Figure 2:
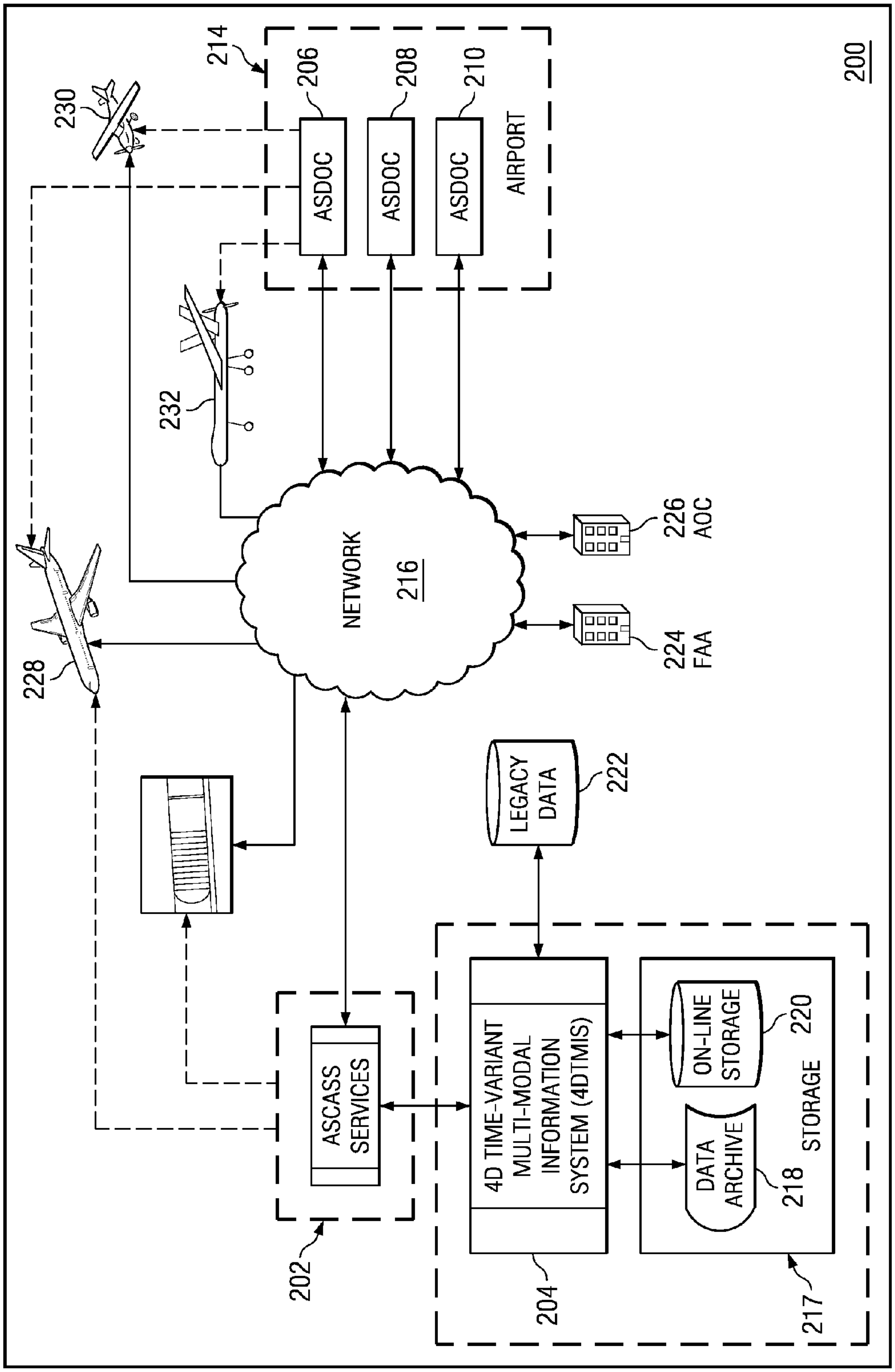
FIG. 2 is a diagram of a spatial object information system in accordance with an advantageous embodiment.

With reference now to FIG. 2, a diagram of a spatial object information system is depicted in accordance with an advantageous embodiment. In this example, spatial object information system 200 is an example of one implementation of spatial object information system 100 in FIG. 1.

In this depicted example, spatial object information system 200 includes aeronautical source collection and services system (ASCASS) 202, four dimensional time-variant multi-modal information system (4DTMIS) 204, autonomous smart data origination components (ASDOC) 206, autonomous smart data origination component (ASDOC) 208, and autonomous smart data origination component (ASDOC) 210. These components are example implementations of sensor units 114 in FIG. 1. These different components are located within a geographic location, such as airport 214. Autonomous smart data origination components 206, 208, and 210 may collect information about spatial objects at airport 214.

These components communicate with aeronautical source collection and services system 202 through network 216. In these examples, network 216 may be one or more networks. Network 216 may be comprised of at least one of a local area network, a wide area network, an intranet, the internet, a satellite network, or some other network.

As used herein, the phrase "at least one of" when used with a list of items means that different combinations of one or more of the items may be used, and only one of each item in the list is needed. For example, "at least one of item A, item B, and item C" may include, for example, without limitation, item A, or item A and item B. This example also may include item A, item B, and item C, or item B and item C. In these different advantageous embodiments, network 216 may be implemented using the Scalable Weekly-Consistent Infection-Style Progress Group Membership (SWIM) protocol. Of course, other protocol may be used depending on the particular implementation.

In these examples, autonomous smart data origination components 206, 208, and 210 may gather real time position status data, as well as other information about spatial objects in airport 214, and send that information to aeronautical source collection and services system 202. In turn, aeronautical source collection and services system 202 may send this information to four dimensional time-variant multi-modal information system 204 for storage in storage 217.

This information may be stored in various persistent storage components, such as data archive 218 and online storage 220. Data archive 218 may provide a back up for online storage 220. Further, data archive 218 may contain older, less accessed information as compared to the information in online storage 220.

Four dimensional time-variant multi-modal information system 204 also may receive legacy data 222. Legacy data 222 may be incorporated with the information received from the different autonomous smart data origination components. In some advantageous embodiments, this update information also may be sent back to legacy data 222 to update legacy data 222. In these examples, online storage 220 may include databases, aeronautical charts, and other suitable information. In these examples, the database may be, for example, an aerodrome mapping database.

The information in data archive 218 and online storage 220 may be made available to various clients of spatial object information system 200 through aeronautical source collection and services system 202. These clients may include, for example, aviation entities 224 and 226. In these examples, aviation entity 224 may be the Federal Aviation Administration (FAA) while aviation entity 226 is the Airline Operations Center (AOC). Other clients that may receive information from spatial object information system 200 include, for example, aircraft 228, aircraft 230, and aircraft 232. These aircraft may be in different locations, such as in flight and/or on the ground at airport 214.

Further, aeronautical source collection and services system 202 may provide value added services. These value added services may include, for example, aggregating, combining, and processing data received in a manner responsive to preferences or requests from specific clients. These examples may include, for example, supplying current information for use on applications, such as moving maps, situation awareness displays, navigation displays, and suitable services.

In some cases, clients may be supplied with raw data for processing. Raw data, in these examples, is data received from autonomous smart data origination components 206, 208, and 210 without processing. In these examples, data may be aggregated from airport 214. Data also may be aggregated from additional locations not shown in spatial object information system 200.

Aggregation, in these examples, involves combining data in a logical manner. For example, the data may be grouped based on geographic locations, such as airports. The data also may be grouped based on spatial objects. As one example, all of the data from all of the autonomous smart data origination components associated with a runway may be grouped together. As yet another example of aggregation, data also may be grouped into an order based on time stamps to batch the data for processing and analysis.

In one illustrative example, a runway at airport 214 may undergo minor construction to shorten the runway. The airport authority updates its inventory and notifies users that the runway is under construction or has been shortened. Autonomous smart data origination components, such as autonomous smart data origination components 206, 208 and 210, may be located at the ends of the runway to broadcast runway status, as well as the length.

When these components are moved to the new position, one hundred (100) feet from the prior location, these components broadcast the new positions. This new information may be placed in online storage 220 to update information about this particular runway.

Further, aeronautical source collection and services system 202 may send out a notice to airman (NOTAM) to inform the aviation community to the change. With the different advantageous embodiments, this notice to airman may be sent out much more quickly than is possible with currently available systems. Also, a report may be sent to airport authority notifying them of the actions that have been taken with respect to the runway.

In yet another illustrative example, a pilot planning to use the runway may send a request for current information to aeronautical source collection and services system 202 for an aeronautical on information affecting the flight plan of the pilot on the planned runway that has been shortened. In response to this request, aeronautical source collection and services system 202 may retrieve data about the runway in response to this request, and return that data for flight planning using the actual runway length.

These examples are merely some illustrative examples of the manner in which spatial object information system 200 may be implemented to provide information to various clients.

Figure 3:
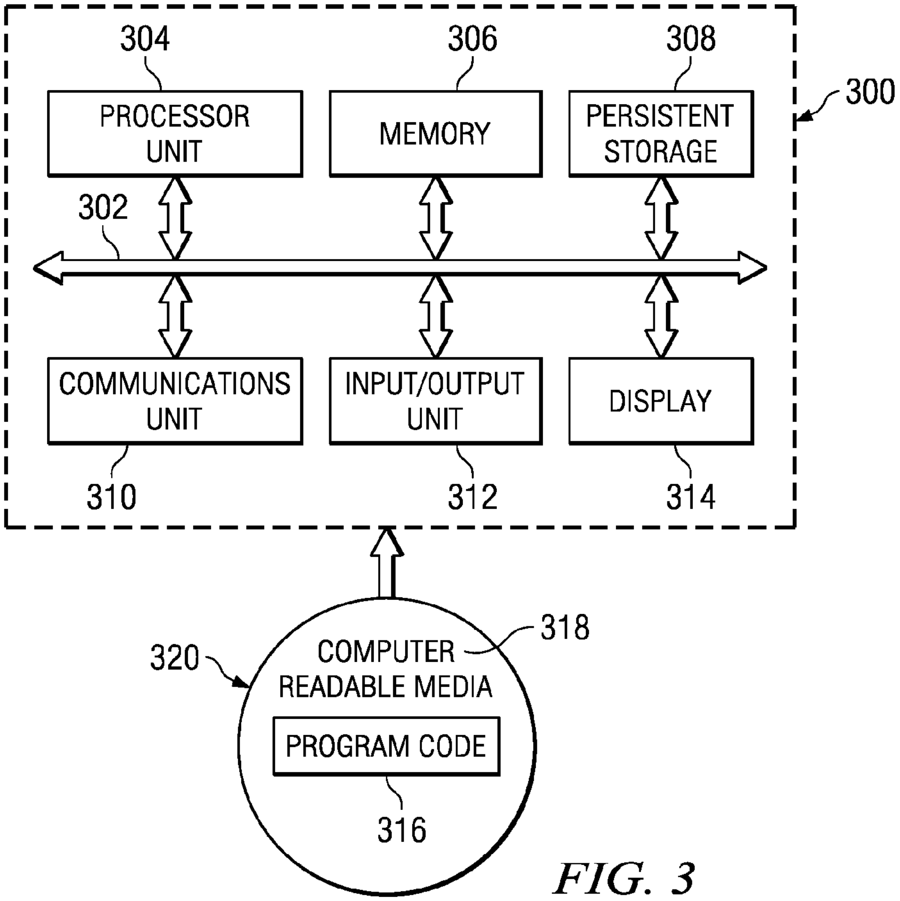
FIG. 3 is a diagram of a data processing system in accordance with an advantageous embodiment.

Turning now to FIG. 3, a diagram of a data processing system is depicted in accordance with an illustrative embodiment of the present invention. Data processing system 300 is an example of a computer that may be used in server system 110 in FIG. 1. Data processing system 300 may be used to execute software components that may be used to provide the different processes in the illustrative examples. Data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device. Persistent storage 308 may take various forms depending on the particular implementation.

For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308.

In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

Figure 4:
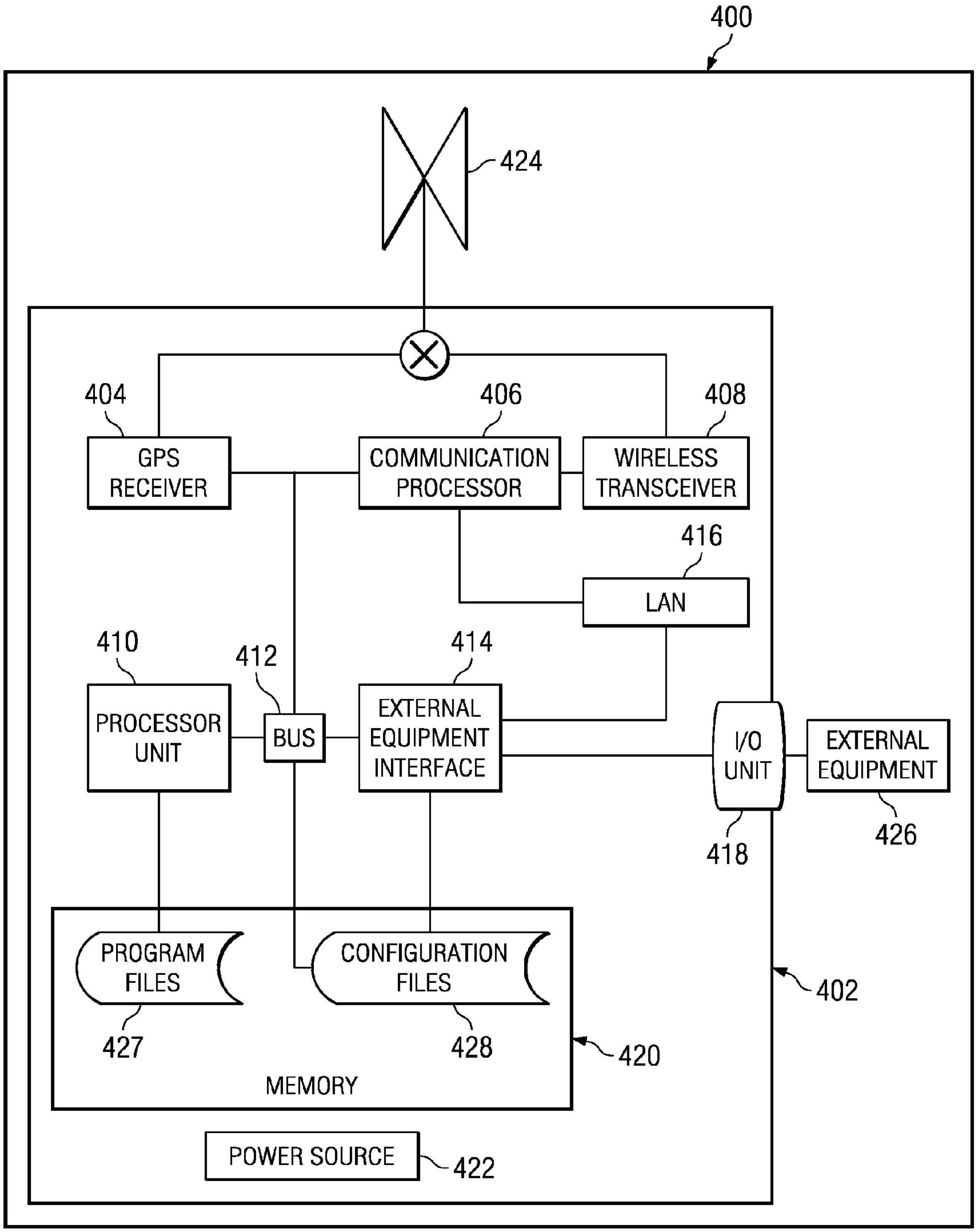
FIG. 4 is a block diagram of a sensor unit in accordance with an advantageous embodiment.

With reference now to FIG. 4, a block diagram of a sensor unit is depicted in accordance with an advantageous embodiment. In this example, autonomous smart data origination component 400 is an example of one implementation of a sensor unit in sensor units 114 in FIG. 1.

As depicted, autonomous smart data origination component 400 is a wireless sensor unit and comprises housing 402, which may contain global positioning system receiver 404, communication processor 406, wireless transceiver 408, processor unit 410, bus 412, external equipment interface 414, local area network (LAN) 416, input/output (I/O) unit 418, memory 420, and power source 422. As depicted, antenna 424 is mounted on housing 402. In other advantageous embodiments, antenna 424 may be located within housing 402.

In this illustrative example, antenna 424 may receive various signals, such as, for example, global positioning system signals, satellite signals, and other wireless signals. Global positioning receiver 404 is a sensor in autonomous smart data origination component 400 that allows autonomous smart data origination component 400 to receive global positioning information to identify the position of autonomous smart data origination component 400.

Wireless transceiver 408 sends and receives information. This information may be data and/or commands. In these examples, wireless transceiver 408 may send data detected by sensors in external equipment 426. Additionally, wireless transceiver 408 may send and receive information with other autonomous smart data origination components that may be aggregated or grouped together.

External equipment 426 may be connected to housing 402 through input/output unit 418, which is a set of physical connectors in this example. Input/output unit 418 may include connections for a universal serial bus, a serial connection, an internet connection, and other suitable connections for external equipment 426. External equipment 426 may include, for example, sensors and other suitable equipment. Sensors in external equipment 426 may be, for example, a temperature sensor, a wind speed sensor, a humidity sensor, a barometer, a wind direction sensor, or some other suitable sensory unit.

Other equipment connected via the input/output 418 using for example the universal serial bus (USB) port may include, for example, an environmental sensor reporting temperature, air quality, and pressure, an infrared or magnetic motion sensor to detect motion of passing vehicles on a runway or taxiway, and external hard drive for additional storage, a counting device that tracks the number of passengers through a gate, a personal computer for general purpose processing transfer of information to and from the component, and/or an aircraft electronic flight bag or similar device.

In addition to or in place of using a universal serial bus in input/output unit for a team, external equipment 426 may be connected to input/output unit 418 using a local area network connection, or a 1394 port, or some other suitable physical connection. A 1394 port is an input/output port following the IEEE 1394 standard.

Communication processor 406 handles sending information to a server in these examples. Communication processor 406 also may handle the receipt of information, such as global positioning information, from global positioning receiver 404. Communication processor 406 may control wireless transceiver 408 to send information.

Memory 420 may take various forms. For example, memory 420 may include random acts as memory, hard disk drives, flash memory, or other suitable storage devices. As an example, memory 420 may take the form of 8 gigabytes of flash memory with additional hard disk drives to increase the memory to around 180 gigabytes. Of course, other storage devices and memory sizes may be provided, depending on the particular implementation.

Further, a universal unique identifier is assigned to autonomous smart data origination component 400 for addressing and identifying this unit. In these examples, this component is Internet capable using various available communications links. These communications links may include satellite links, wireless mobile phone links, wireless internet links, or other suitable communications links. Although the different depicted examples employ wireless communications links, wired links may be used depending on the implementation.

Bus 412 and local area network 416 provide communication interconnections between various components for autonomous smart data origination component 400. External equipment interface 414 manages input/output unit 418. Processor unit 410 may execute program files 427 and use configuration information found in configuration files 428 to report information about spatial objects. Program files 427 also may include other programs, such as, for example, an operating system and other software needed to monitor spatial objects and perform various operations.

In these examples, the information may include, for example, a status, a position, and a time for the aeronautical object. When activated, autonomous smart data origination component 400 is self aware about the spatial environment and may detect changes in its position as changes occur to a spatial object, or if autonomous smart data origination component 400 is moved. In other words in being self aware of the spatial and temporal environment, autonomous smart data origination component 400 may be aware of other autonomous smart data origination components that may be associated with the spatial object and/or may be aware of its position of location on the spatial object.

The components by sensing changes in their spatial position and orientation are able to check against programmed spatial tolerances if they have been moved. The smartness also comes from changes in spatial orientation or position beyond the programmed tolerances occurring without authorization, and then an appropriately programmed action, such as alerting and changing the content of its broadcast message, will occur. Alerting can be priority transmission to other components in a group, its associated data server, users, or other suitable entities to inform them of the unauthorized state of the component and/or a request for action to help resolve the situation.

A change in message content can range from an information message describing the situation to a complete shutdown of the message transmission. The nature of the content change is determined by the previous programming sent to the component to define its behavior. The component also tracks the passage of time and will respond to changes in its internal time base or to the time base from GPS or to a time base of an attached sensor. Depending on the magnitude and type of time change detected an alert of message change response similar to the spatial change described above will occur.

The smart device can also be programmed to take on the characteristics and behavior of an arbitrary device thus allowing it to function as the programmed device. An example might be programming autonomous smart data origination component 400 to perform a vehicle counting function when an external infrared counting sensor is attached to the input/output unit 416.

Autonomous smart data origination component 400 would then count objects passing the infrared counting sensor and could process this counting data. Autonomous smart data origination component 400 may then report on this information as requested. The smart nature of the component 400 may be limited only by the type of devices that can be attached to the input/output unit 418 and the programs that can be loaded in a general purpose processing unit.

In this manner autonomous smart data origination component 400 may make various measurements and generate data in response to a change in measurement. In these examples the change in measurement may be, for example, at least one of a change in position of autonomous smart data origination component 400 and a change in a state of the spatial object associated with autonomous smart data origination component 400.

This change in state could be a change state of the spatial object and/or the environment around the spatial object. These changes in state may include, for example, changes in temperature, a change in wind speed, a change in wind direction, or some other suitable parameter or quantity measured by autonomous smart data origination component 400.

In these examples, power source 422 may be, for example, a five-volt DC battery. In other advantageous embodiments, power source 422 may include, for example, a solar cell, or some other energy harvesting device.

In some advantageous embodiments, processor unit 410 may take the form of a microcomputer having components similar to data processing system 300 in FIG. 3. In these examples, autonomous smart data origination component 400 may be configured to limit and/or restrict access.

For example, secure access methods such as, for example, password and/or biometric authorization methods may be used in authorizing functionality such as downloading programs, generating alerts, changing location, changing configuration of equipment, or setting the behavior of the component. Another example may include the use of electronic signatures when sending data to ensure non-reputability of the information. Public/private keys may also be used for data protection.

In these examples, autonomous smart data origination component 400 may report information in a number of different ways. For example, reporting may be periodically or based on events. At a minimum, the location and time the information sent is transmitted by autonomous smart data origination component 400.

Multiple autonomous smart data origination components may be aggregated with each other to form a spatial object. These components may be associated and/or programmed to form the shape of a spatial object such as, for example, a runway. As a result, the aggregated autonomous smart data origination components may communicate with each other to provide a general awareness of changes to the overall shape of the runway or other spatial object. In these examples, each autonomous smart data origination component has a universal unique identifier to provide a unique address on a global basis. The aggregations may be managed and tracked at a server system using these identifiers.

Figure 5:
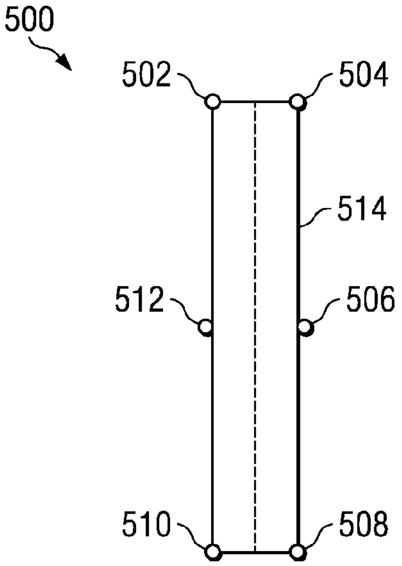
FIG. 5 is a diagram illustrating an aggregation of autonomous smart data origination components in accordance with an advantageous embodiment.

With reference now to FIG. 5, a diagram illustrating an aggregation of autonomous smart data origination components is depicted in accordance with an advantageous embodiment. In this example, the spatial object is runway 500. Autonomous smart data origination components 502, 504, 506, 508, 510 and 512 are placed around perimeter 514 of runway 500.

In this example, all of the different components are aware of the other autonomous smart data origination components associated with runway 500. As a result, autonomous smart data origination components 502, 504, 506, 508, 510 and 512 may communicate and share information with each other and form calculations as a group. In other advantageous embodiments, a single autonomous smart data origination component may receive data from the other autonomous smart data origination components and perform different calculations.

In this example, the different autonomous smart data origination components may obtain wind speed and wind direction data. All of this data may be processed to identify wind conditions for runway 500. These wind conditions may then be transmitted to an aeronautical source collection and services system and/or a client, such as a control tower or aircraft. These different components may determine when a wind condition requiring an alert is present and may send out the alert in other advantageous embodiments. An example of a wind condition that may require an alert is wind shear over or near runway 500.

This illustration of runway 500 is only one example of a spatial object in which different autonomous smart data origination components may be aggregated. Other examples include, for example, taxiways, towers, cranes, barriers, fences, and other suitable spatial objects.

In some advantageous embodiments, the information generated by autonomous smart data origination components 502, 504, 506, 508, 510 and 512 is not shared and/or processed by the different components. Instead, the information is sent to a server system, such as server system 110 in FIG. 1. The server system aggregates and analyses the data sent by autonomous smart data origination components 502, 504, 506, 508, 510 and 512.

Figure 6:
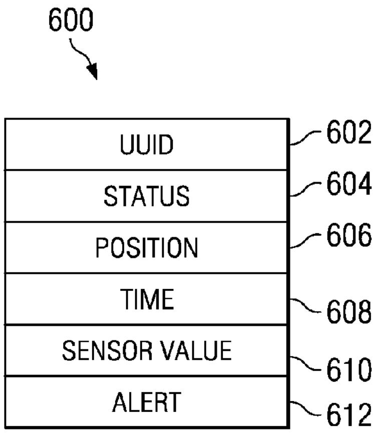
FIG. 6 is a diagram illustrating data that may be transmitted by a sensor unit in accordance with an advantageous embodiment.

With reference now to FIG. 6, a diagram illustrating data that may be transmitted by a sensor unit is depicted in accordance with advantageous embodiment. In this example, message 600 is an example of a message that may be found in data 116 in FIG. 1. In this illustrative example, message 600 includes universal unique identifier 602, status 604, position 606, time 608, and sensors values 610.

Universal unique identifier 602 uniquely identifies the autonomous smart data origination component sending message 600. Status 604 provides status information about the autonomous smart data origination component. In other words, status 604 may provide information about the condition of this component. This information may include, for example, an amount of memory used, a power level of a battery, an amount of power generated by an energy harvesting device, and other suitable information.

Position 606 contains information about the location of the autonomous smart data origination component. Position 606 also may include the spatial orientation of the autonomous smart data origination component. Time 608 is a timestamp indicating when the information was generated and/or sent.

Sensors values 610 may include additional information such as, for example, time, temperature, weather conditions, pressure, wind speed, wind direction, and suitable values.

Alert 612 may be generated and/or included in message 600 if the autonomous smart data origination component was moved in an unauthorized manner. Further, alert 612 may be generated based on the processing of position 606 and sensors values 610. For example, if the autonomous smart data origination component detects conditions indicating wind shear, alert 612 may be generated. This type of processing may be performed through a single autonomous smart data origination component or multiple ones located on a spatial object, such as, for example, a runway. In this manner, the alert may identify the runway, as well as indicate that wind shear conditions are present.

Figure 7:
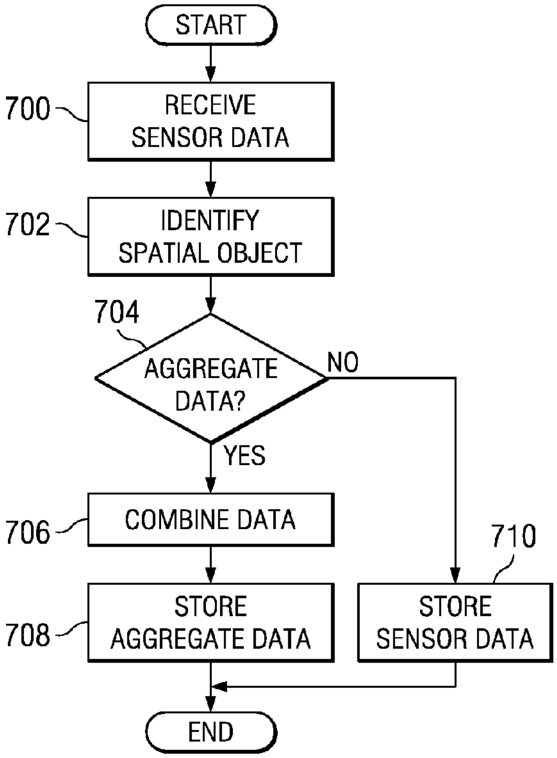
FIG. 7 is a flowchart of a process for receiving data from a sensor unit in accordance with an advantageous embodiment.

Turning now to FIG. 7, a flowchart of a process for receiving data from a sensor unit is depicted in accordance with an advantageous embodiment. The process illustrated in FIG. 7 may be implemented in a software component, such as collection and services 118 in FIG. 1.

The process begins by receiving sensor data (operation 700). The process then identifies the spatial object for the sensor data (operation 702). Operation 702 may be performed by using a universal unique identifier in the message from the sensor unit. This identifier may be used to identify the spatial object associated with that sensor unit. A determination is made as to whether the data for the spatial object should be aggregated with other data (operation 704). For example, the identified autonomous smart data origination component may be examined to determine whether this component is part of an aggregate with other autonomous smart data origination components for a spatial object.

This determination may be made using the universally unique identifier for the autonomous smart data origination component and determine whether that identifier is associated with any other autonomous smart data origination component. If the object is related to other autonomous smart data origination components, then an aggregation of data should be made to aggregate this data with other data from the related autonomous smart data origination components.

If the data should be aggregated, the data may then be combined with other data for the spatial object (operation 706). The process then stores the aggregated sensor data in association with the spatial object (operation 708), with the process terminating thereafter.

With reference again to operation 704, if the data is not to be aggregated with other sensor data, the process then stores the sensor data in association with spatial object (operation 710) with the process terminating thereafter.

Figure 8:
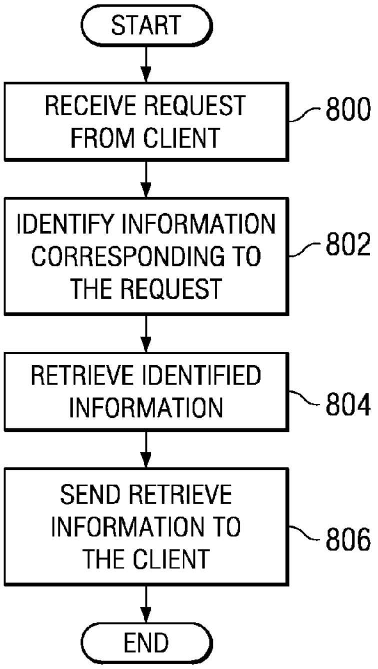
FIG. 8 is a flowchart of a process for handling client requests in accordance with an advantageous embodiment.

With reference now to FIG. 8, a flowchart of a process for handling client requests is depicted in accordance with an advantageous embodiment. The process illustrated in FIG. 8 may be implemented in a component, such as client services 119 within server system 110 in FIG. 1. This process may be used to handle requests for information regarding spatial objects.

The process begins by receiving a request from a client (operation 800). In these examples, the request may take various forms. For example, the request may be to receive update information for a particular spatial object. In other advantageous embodiments, the request may be, for example, for an entire database, such as an aerodrome mapping database or an aeronautical chart.

The process identifies the information corresponding to the request (operation 802). In the case of the request for information about a spatial object, the process identifies the particular spatial object in a database. The process retrieves the identified information (operation 804). The process then sends the information to the client (operation 806), with the process terminating thereafter.

Figure 9:
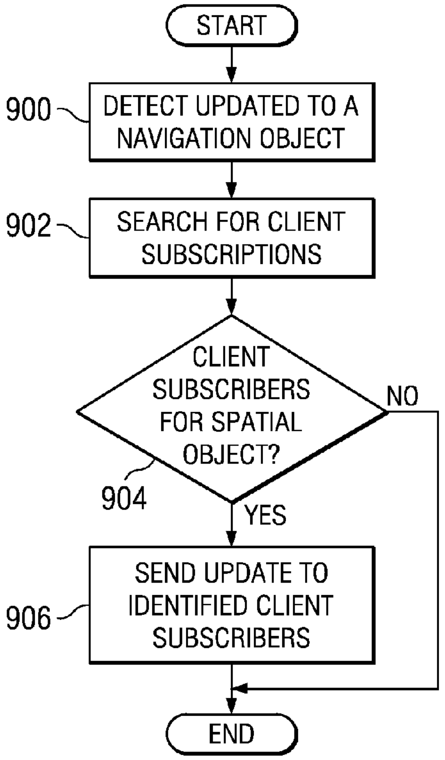
FIG. 9 is a flowchart of a process for automatically updating spatial objects in accordance with an advantageous embodiment.

With reference now to FIG. 9, a flowchart of a process for automatically updating spatial objects is depicted in accordance with an advantageous embodiment. The process illustrated in FIG. 9 may be implemented using a client service, such as client services 119 in FIG. 1.

This process may be used to automatically send information to a client that may have a subscription to obtain update information. This subscription may be for a particular spatial object or for any changes with respect to updates to a particular database, set of databases, navigation chart, or some other grouping.

The process begins by detecting an update to a spatial object (operation 900). The process searches for client subscriptions (operation 902). This search may identify any clients that have subscriptions to receive update information. The process then determines whether client subscriptions are present for the spatial object (operation 904). The determination in operation 904 may be made by determining whether the spatial object is in a database where a data structure is subscribed to by the client.

If client subscriptions are present for the spatial object, the update is sent to the identified client subscribers (operation 906), with the process terminating thereafter. With reference again to operation 904, if client subscriptions are not present for the spatial object, the process terminates.

In other advantageous embodiments, the process in FIG. 9 may be preformed periodically rather than based on the detection of an update. For example, this process may be executed on a monthly basis, a weekly basis, a daily basis, an hourly basis, or some other suitable period of time. The amount of time may depend on the urgency of the data and/or the type of subscription.

Figure 10:
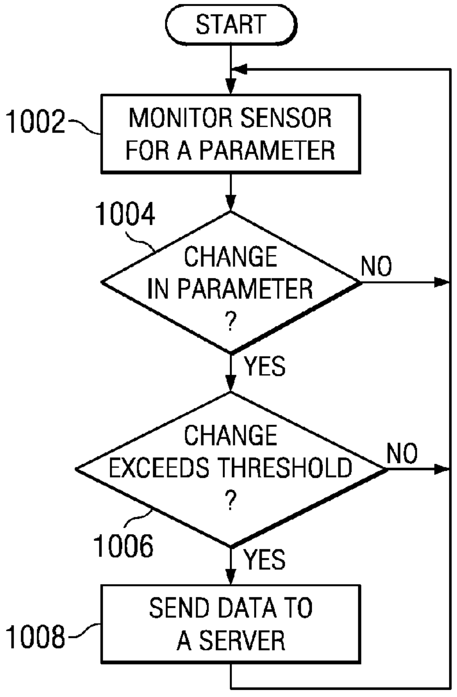
FIG. 10 is a flowchart of a process for monitoring a spatial object in accordance with an advantageous embodiment.

With reference now to FIG. 10, a flowchart of a process for monitoring a spatial object is depicted in accordance with an advantageous embodiment. The process illustrated in FIG. 10 may be implemented in a sensor unit, such as autonomous smart data origination component 400 in FIG. 4. This process may be executed for each sensor in an autonomous smart data origination component.

The process begins by monitoring a sensor for a parameter (operation 1002). In these examples, the parameter by be, for example, a position of the autonomous smart data origination component. In other advantageous embodiments, this parameter may be, for example, a temperature, wind direction, wind speed, humidity, or some other suitable parameter being monitored. In this implementation, the sensor may be, for example, an antenna in a global positioning system receiver.

Next, a determination is made as to whether a change has been identified by the parameter (operation 1004). If a change has occurred, a determination is made as to whether the change exceeds a threshold (operation 1006). Operation 1006 is employed such that changes below a certain amount may not be reported. This avoids sending to much data when the changes are considered ones that are necessary for updates. If the change exceeds the threshold, the process sends the data to a server (operation 1008), with the process then returning to operation 1002.

With reference again to operation 1006, if the change in the parameter does not exceed the threshold, the process also returns to operation 1002. The process returns to operation 1002 from operation 1004 if a change does not occur in the parameter.

Figure 11:
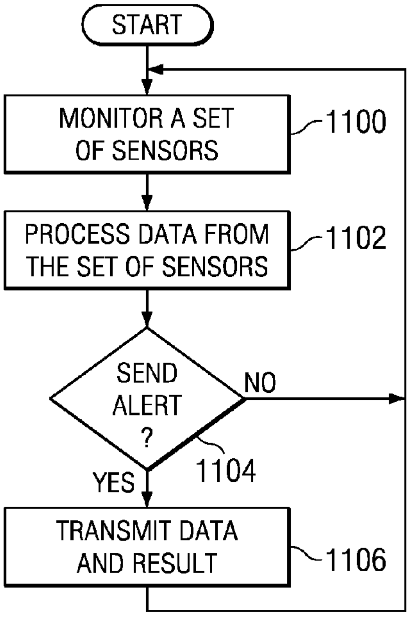
FIG. 11 is a flowchart of a process for monitoring a spatial object in accordance with an advantageous embodiment.

With reference now to FIG. 11, a flowchart of a process for monitoring a spatial object is depicted in accordance with an advantageous embodiment. The process illustrated in FIG. 11 may be implemented to monitor sensors for a grouping of autonomous smart data origination components. These components may be, for example, autonomous smart data origination components arranged around the perimeter of a runway. One or more of the autonomous smart data origination components may process the data.

The process begins by monitoring a set of sensors (operation 1100). The process processes the data from the set of sensors (operation 1102). A determination is made as to whether to send an alert based on the processing of the data (operation 1104). If an alert is not to be sent, the process returns to operation 1100. Otherwise, the process transmits the data and the result from processing the data (operation 1106), with the process then returning to operation 1100.

In operation 1106, the data may be the data processed to generate the alert. For example, the sensors may include sensors to detect wind speed and wind direction. In processing this data by the different autonomous smart data origination components around the runway, a determination may be made that wind shear is present. If wind shear is identified, then an alert is generated and transmitted.

Figure 12:
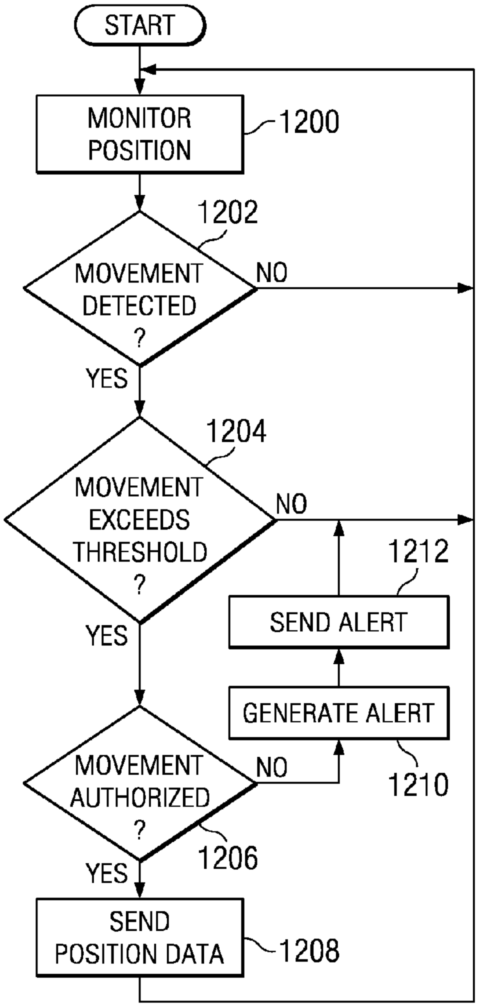
FIG. 12 is a flowchart of a process for monitoring for unauthorized movement of a sensor unit in accordance with an advantageous embodiment.

With reference now to FIG. 12, a flowchart of a process for monitoring for unauthorized movement of a sensor unit is depicted in accordance with an advantageous embodiment. In this example, the process may be implemented in a sensor, such as autonomous smart data origination component 400 in FIG. 4.

The process begins by monitoring the current position of the autonomous smart data origination component (operation 1200). A determination is made as to whether movement has been detected (operation 1202).

If movement had not been detected, the process returns to operation 1200. Otherwise, a determination is made as to whether the movement exceeds a threshold (operation 1204). In this example, the threshold may be some distance that is reasonable for movement during normal use. Any distance greater than the threshold may be considered an unauthorized movement in these examples.

If the movement does not exceed a threshold, the process returns to operation 1200. Otherwise, a determination is made as to whether the movement has been authorized (operation 1206). In some cases, repositioning of the autonomous smart data origination component may occur. In this case, the movement may be authorized. In this instance, the position data is sent to a server (operation 1208) with the process returning to operation 1200 as described above. This position data serves as an update for spatial object.

With reference again to operation 1206, if the movement is not authorized, an alert is generated (operation 1210). This alert includes an indication that an unauthorized movement of the autonomous smart data origination component has occurred. The alert also includes the position of the component. The process then sends the alert to a server (operation 1212), with the process returning to operation 1200 as described above.

In these examples, the unauthorized movement may be, for example, some personnel or person moving the autonomous smart data origination component without permission. Another instance, in which unauthorized movement may occur, is if the autonomous smart data origination component has become dislodged or moved through some other action.

Figure 13:
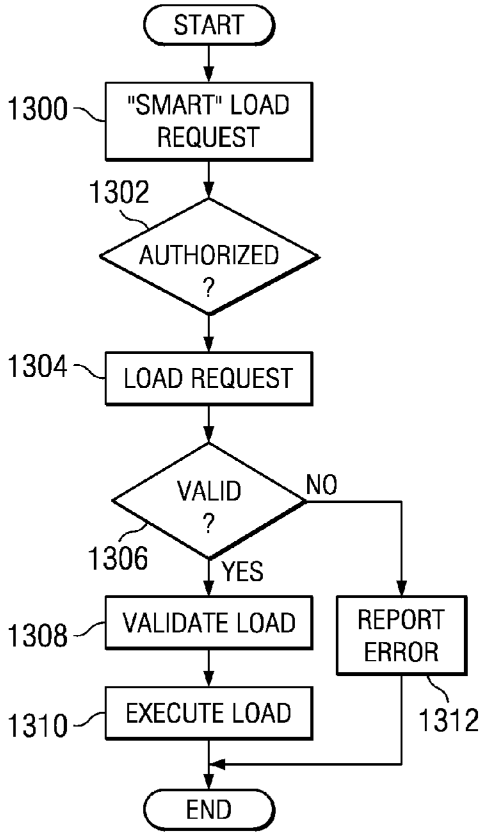
FIG. 13 is a flowchart of a process for smart behavior processing in accordance with an advantageous embodiment.

With reference now to FIG. 13, a flowchart of a process for smart behavior processing is depicted in accordance with an advantageous embodiment. The process illustrated in FIG. 13 may be implemented in a sensor, such as autonomous smart data origination component 400 in FIG. 4.

The process begins by receiving a smart load request (operation 1300). In operation 1300, the smart load request may take various forms. Typically, loading code or other instructions for smart behavior may be requested in operation 1300. The smart load request may provide the autonomous smart data origination component a capability to function as a program device. A determination is made as to whether the smart load request is authorized (operation 1302).

Operation 1302 may involve performing various checks. These checks may include, for example, determining whether the request is from an authorized source and/or if the requester is an authorized person or component. This determination may be made by using, for example, without limitation, an access control list or some other database to verify whether the request is authorized.

If the request is not authorized, the process returns to the beginning of the process. In operation 1302, if the smart load request is authorized, the request is then loaded (operation 1304). The loading of the request, in these examples, may involve down loading or receiving program code. In loading the request, the program code and/or other information loaded is referred to as a load. This loading may be performed either through a wireless or wired connection depending on the particular implementation.

Next, a determination is made as to whether the smart load request is valid (operation 1306). Operation 1306 may include, for example, determining whether the program code loaded in operation 1304 contains errors and/or is the correct code. If the program code is valid, the process then validates the load (operation 1308). In operation 1308, the process indicates that the load is valid and may be executed. Thereafter, the process executes the load (operation 1310), with the process terminating thereafter.

With reference again to operation 1306, if the load performed in operation 1304 is not valid, an error is reported (operation 1312) with the process terminating thereafter.

As a result of executing the load in operation 1310, the autonomous smart data origination component takes on the characteristics and behavior as specified in the load. For example, the autonomous smart data origination component may perform a vehicle counting function using an external infrared counting sensor and report these counts based on the loaded behavior. Thus, a behavior as to how an autonomous smart data origination component makes measurements may be changed. The behavior may be to make different measurements or to make measurements at different times. The change in behavior also may include a change in how data is reported.

Thus, in different advantageous embodiments, a method and apparatus obtains data about spatial objects. The data is received from a set of sensor units associated with a set of spatial objects in real time to form received data, wherein the data is generated in response to a change in measurement of a sensor unit in the set of sensor units. A collection of data for spatial objects is updated with the received data.

As described above, in the different illustrative examples, this change in measurement may be, for example, without limitation, a change in position and/or a change in state of the sensor and/or object associated with the sensor.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, semiconductor system, or a propagation medium. Non-limiting examples of a computer-readable medium include a semiconductor or solid-state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:

receiving data from a plurality of sensor units associated with a corresponding plurality of spatial objects in real time to form received data, wherein each sensor unit in the plurality of sensor units includes a global positioning system for identification of a location and position of the each sensor unit, wherein a group of the plurality of sensor units has a spatial relationship that describes a shape of a grouped spatial object in the plurality of spatial objects, wherein the received data is generated in response to a change in a measurement made by at least one sensor unit in the plurality of sensor units, wherein the change comprises at least one of a position change and a location change of the at least one sensor unit, and wherein the received data includes a corresponding plurality of unique identifiers, location information, position information, and time stamps for each of the plurality of sensor units associated with the plurality of spatial objects;

identifying the plurality of spatial objects for the received data using the plurality of unique identifiers in the received data, wherein each of the plurality of unique identifiers identifies a particular spatial object associated with a particular sensor unit; and updating a collection of data for the plurality of spatial objects with the received data, wherein the collection of data further includes the shape of the grouped spatial object.

2. The method of claim 1, wherein the received data further comprises information about an environment around the plurality of spatial objects.

3. The method of claim 2, wherein one or more of the plurality of sensor units are self aware about the environment.

4. The method of claim 1 further comprising:

generating additional received data, by the plurality of sensor units, based on a policy used to report a sensor state; and sending the additional received data to update the collection of data.

5. The method of claim 1, wherein the group of the plurality of sensor units communicate with each other and with a data processing system, and wherein the method further comprises:

determining, with the data processing system, changes to an overall shape of the grouped spatial object.

6. The method of claim 5, wherein the grouped spatial object is a runway at an airport and wherein the group of the plurality of sensor units is located along a perimeter of the runway.

7. The method of claim 5, wherein the group of the plurality of sensor units is associated with each other.

8. The method of claim 5, further comprising:

aggregating portions of the received data associated with the group of the plurality of sensor units.

9. The method of claim 1 further comprising:

sending the collection of data for the plurality of spatial objects with updates to a client.

10. The method of claim 9, wherein the client is a data processing system located on one of an aircraft and a ship.

11. The method of claim 1, wherein the change in the measurement made by the at least one sensor unit in the plurality of sensor units is an unauthorized change in a position of the at least one sensor unit.

12. The method of claim 1, wherein the collection of data is for an aerodrome mapping database.

13. The method of claim 1 further comprising:

converting the received data into a geographic information systems format prior to storing the received data in the data processing system.

14. The method of claim 1, wherein the plurality of sensor units each comprise a set of sensors, a processor unit, a communications unit, and a housing.

15. The method of claim 1 further comprising:

providing a service to a set of clients using the collection of data with updates.

16. The method of claim 15, wherein the service comprises at least one of aeronautical charts, airport assessments updates, monitoring and alerts regarding spatial objects, security services, emergency landing sites, an identification, home land defense emergency landing sites, home land defense temporary operation sites, aggregation and filtering of spatial object data, notice to airman real time alerting, data for cogitated applications requiring time variant information, visual flight rules object identification, and visual flight rules aerial identification.

17. The method of claim 1, wherein the plurality of spatial objects each are selected from the group consisting of a runway, a taxiway, a barrier, a building, a crane, a control tower, and a vehicle.

18. The method of claim 1, wherein the plurality of sensor units may change a pattern of reporting data in response to a change in position or time.

19. The method of claim 1, wherein the measurement further comprises a state of one or more of the plurality of spatial objects.

20. The method of claim 1 further comprising:

changing how a particular sensor unit in the plurality of sensor units makes measurements.

21. A system comprising:

a plurality of sensor units configured to receive data associated with a corresponding plurality of spatial objects in real time to form received data, wherein each sensor unit in the plurality of sensor units includes a global positioning system for identification of a location and position of the each sensor unit, wherein a group of the plurality of sensor units has a spatial relationship that describes a shape of a grouped spatial object in the plurality of spatial objects, wherein the received data is generated in response to a change in a measurement made by at least one sensor unit in the plurality of sensor units, wherein the change comprises at least one of a position change and a location change of the at least one sensor unit, and wherein the received data includes a corresponding plurality of unique identifiers, location information, position information, and time stamps for each of the plurality of sensor units associated with the plurality of spatial objects;

a data processing system in communication with the plurality of sensor units, wherein the data processing system is configured to identify the plurality of spatial objects for the received data using the plurality of unique identifiers in the received data, wherein each of the plurality of unique identifiers identifies a particular spatial object associated with a particular sensor unit, and wherein the data processing system is further configured to update a collection of data for the plurality of spatial objects with the received data, wherein the collection of data further includes the shape of the grouped spatial object.

22. The system of claim 21, wherein the group of the plurality of sensor units are configured to communicate with each other to provide the data processing system with an awareness of changes to an overall shape of the grouped spatial object.

23. The system of claim 22 wherein the grouped spatial object is a runway at an airport, wherein the group of the plurality of sensor units is located along a perimeter of the runway, and wherein the change in the measurement made by the at least one sensor unit in the plurality of sensor units is an unauthorized change in a position of the at least one sensor unit.

* * * * *